Feb. 9, 1971 — F. A. DAHMS — 3,561,941
TRIPLE GOB SETTLE BLOWHEAD AND BAFFLE CONSTRUCTION
Filed June 4, 1968 — 2 Sheets-Sheet 1
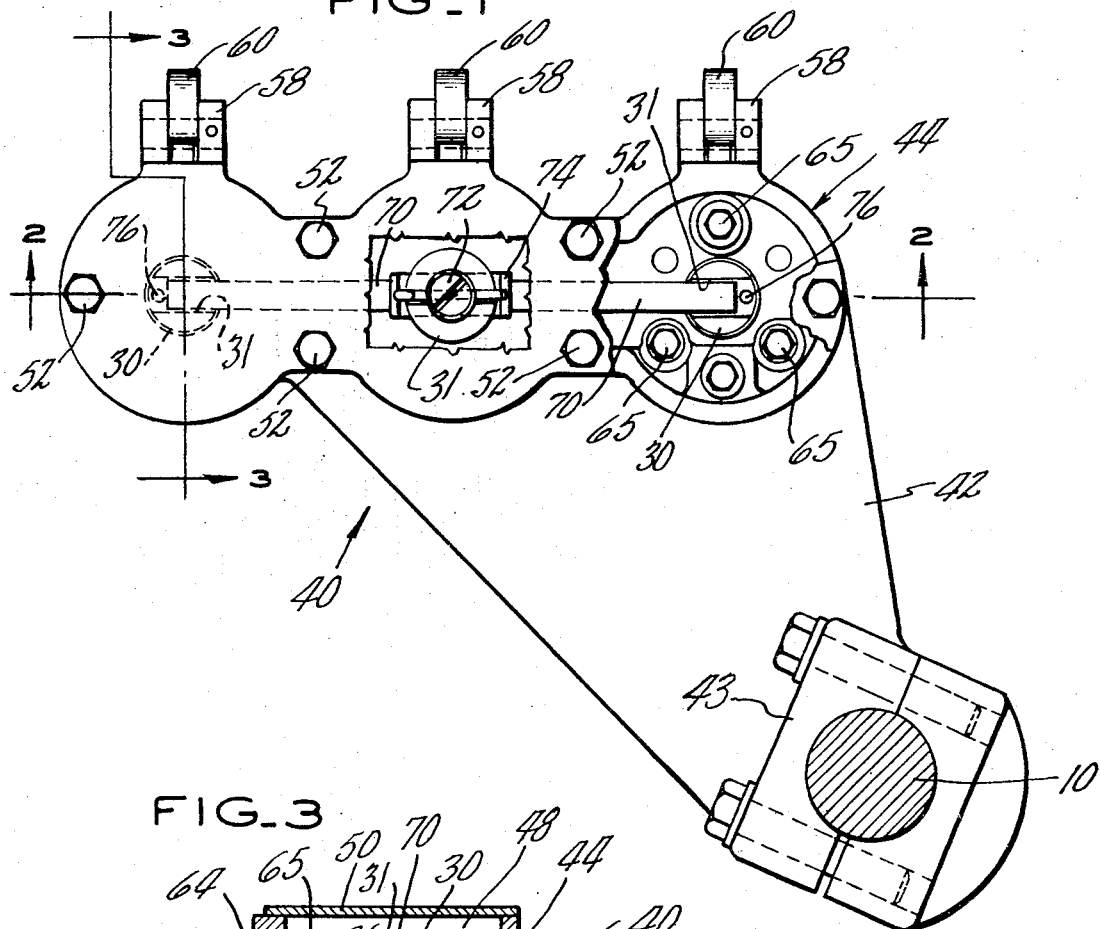
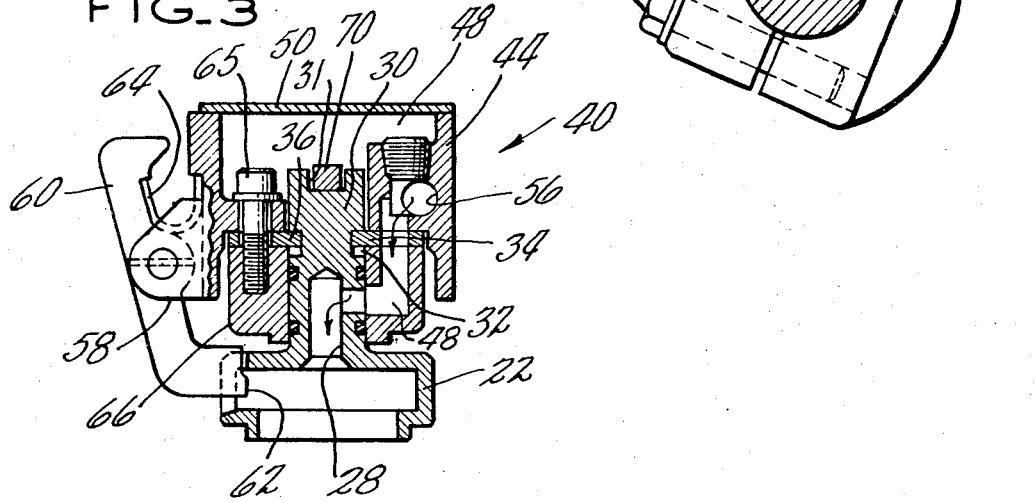
INVENTOR
FRANCIS A. DAHMS
BY McCormick, Paulding & Huber
ATTORNEYS

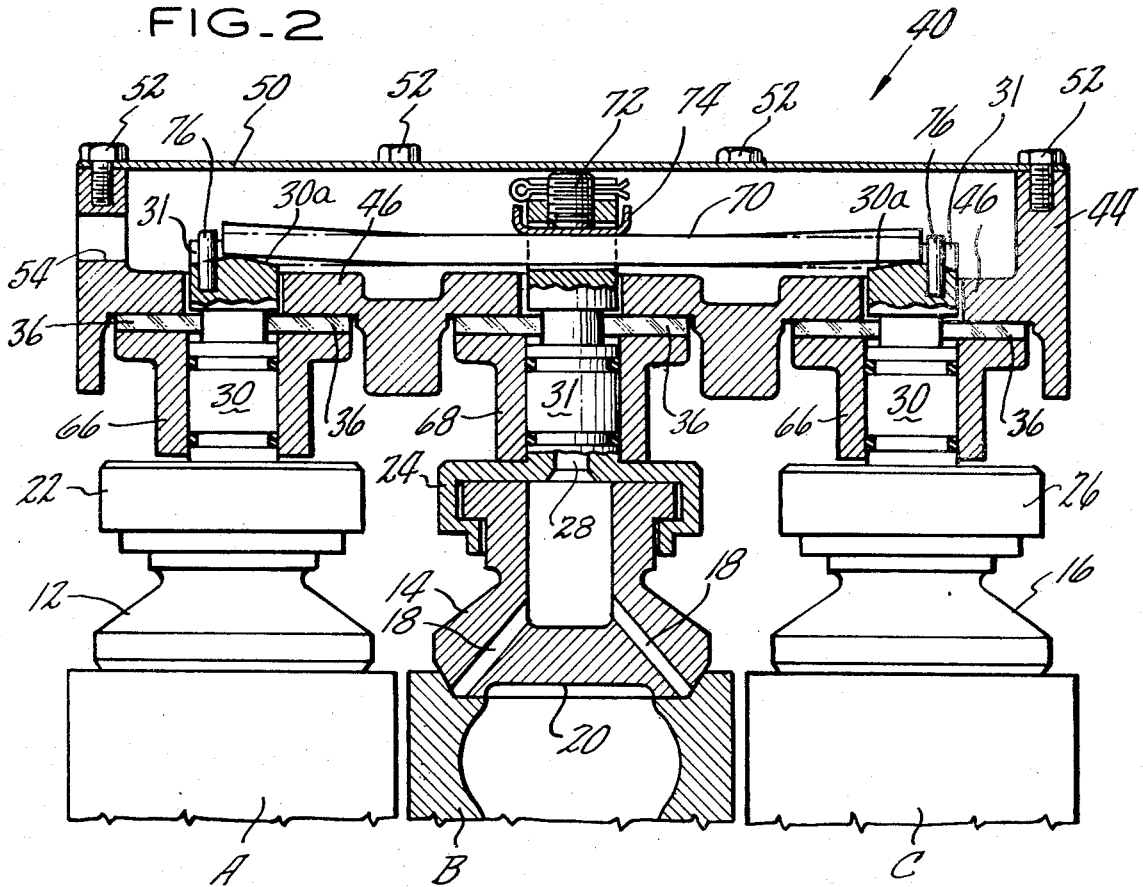

3,561,941
TRIPLE GOB SETTLE BLOWHEAD AND
BAFFLE CONSTRUCTION
Francis A. Dahms, Tariffville, Conn., assignor to Emhart
Corporation, Bloomfield, Conn., a corporation of Connecticut
Filed June 4, 1968, Ser. No. 734,457
Int. Cl. C03b 9/14
U.S. Cl. 65—261
5 Claims

ABSTRACT OF THE DISCLOSURE

In the blank mold side of a triple gob Hartford I.S. Glassware Forming Machine Section, a settle blowhead and baffle carrier is provided for supporting three settle blowheads or baffles in depending relationship for movement into registration with corresponding openings in three individual blank molds. Two of the three baffles are slidably supported in the carrier for limited vertical floating movement and a single leaf spring urges these two baffles downwardly below the third so that as the baffles engage their respective blank mold openings, the spring is resiliently deformed to equalize the closing forces between all three baffles and their respective blank molds.

SUMMARY OF INVENTION

The present invention relates generally to the manufacture of glassware, and more particularly to the production of blown glassware in a forming machine of the Hartford I.S. type in which a plurality of glass charges or gobs are deposited in blank molds and there formed into parisons or blanks which are subsequently transferred to finishing molds where they are blown into final shape.

These glass charges are generally smaller in size than the cavity provided in the blank molds, and are fed downwardly into the open upper ends of the inverted blank molds. Suitable neck ring molds are associated with each of the blank or parison molds, each having a neck pin or the like for molding the neck or finish portion of the parison. As described in detail in Pat. No. 1,911,119, issued to Ingle on May 23, 1933, a settle blowhead is provided on a suitable carrier, or arm and is generally lowered into position on top of a funnel through which the gob is initially deposited in the blank mold. The settle blowhead is used to settle the charge in the lower portion of the blank mold and especially into the neck ring mold itself for positive forming of this portion of the blank or parison. The settle blowhead is then raised out of position, and the funnel removed, at which time the settle blowhead is lowered into position directly against the blank mold, and in this position serves as a baffle for permitting counter-blowing or pressing of the parison through the neck ring mold, the settle blow air passageways in the settle blowhead or baffle being closed off during this portion of the cycle of operation of the glassware forming machine. Thus, the so-called settle blowhead or baffle serves a dual function in packing or settling the charges in their respective neck ring or blank molds, and also to subsequently cooperate with the open end of the blank mold to permit expanding of the charge upwardly into conformity with a parison cavity defined in part by the blank mold and in part by the baffle.

A general object of the present invention is to provide an improved blowhead or baffle construction wherein a novel carrier supports at least three blowheads or baffles so that at least two are mounted for limited vertical floating movement to equalize the closing forces between said baffles and their corresponding individual molds.

A more specific object of the present invention is to provide a settle blowhead and baffle construction wherein the settle blowheads and baffles are engaged by a single leaf-type spring so arranged in the carrier as to urge at least two of said baffles toward an initial position wherein they are located below the third baffle so that the closing forces produced upon engagement between all of said baffles and said blank molds tend to be equalized with respect to one another as the leaf spring is deflected in response to downward movement of the carrier.

BRIEF DESCRIPTION OF THE DRAWINGS

FIG. 1 is a plan view of a blowhead or baffle carrier construction incorporating the present invention.

FIG. 2 is a vertical sectional view taken along the line 2—2 of FIG. 1.

FIG. 3 is a vertical sectional view taken along the line 3—3 of FIG. 1.

DETAILED DESCRIPTION

Turning now to the drawings in greater detail, FIG. 1 shows a vertically disposed actuating rod 10 which is adapted to be oscillated in a conventional manner by mechanisms such as that described more completely in the above-mentioned patent to Ingle so as to cause the blowheads or baffles supported therein to move between the active position shown in FIG. 2 and an inactive position (not shown) wherein said baffles are out of engagement with their associated blank molds. FIG. 2 shows three individual blank molds A, B, C arranged in side-by-side relationship for receiving gobs of molten glass which in this view will have been settle blown so as to be packed in the respective neck ring portions of the blank molds (not shown). Thus, in FIG. 2 the baffles 12, 14 and 16 have been lowered into position in registration with the upwardly open blank molds A, B and C, respectively. The settle blow air passageways 18, 18 in each of the settle blowheads and baffles 12, 14 and 16 have been rendered ineffective during this portion of the machine's cycle so as to permit counter-blowing air pressure supplied through the neck portion of the blank mold to expand the charges into conformity with the internal cavity 20 formed in part by the blank mold B and in part by the baffle 14.

The settle blowheads and baffles 12, 14 and 16 comprise conventional components of the machine shown, and are held in corresponding holders 22, 24 and 26, respectively, in a conventional manner. As best shown in FIG. 3, each holder defines suitable internal ports as, for example, that shown at 28 for permitting settle blow air to be available to the settle blow air passageways 18, 18 in the heads 12, 14 and 16. Still with reference to FIG. 3, the holder 22 can be seen to include an upstanding post portion 30 having an annular recess 32 for receiving the half sections of a split ring 34 and 36. As best shown in FIG. 2, the split ring sections 34 and 36 allow vertical floating movement of the holder post 30 as a result of the annular recess 32 being of a somewhat greater axial extent than the thickness of the split ring sections 34 and 36.

Turning now to a more complete description of the settle blowhead and a baffle carrier 40 in which the holders 22, 24, and 26 are supported, FIG. 1 shows said carrier as comprising a generally radially extending arm portion 42 which is adapted to be clamped to the oscillating rod 10 by clamp means 43. The arm 42 supports a housing 44 having a lower wall 46 with openings for receiving the upstanding post portions 30, 31, and 30 of the holders 22, 24, and 26 respectively.

The housing 44 defines an upwardly open cavity which is covered by a plate 50. Screws 52, 52 can be readily removed to permit adjustment to be made of the center distances between the holders 30, 31 and 30. Screws 65, 65 fit loosely in slightly oversize openings in the lower wall 46 of the housing so that this adjustment can be accomplished. Suitable ports, as indicated generally at 48 and 56 in FIG. 3, are provided in the side wall of the housing 44 to permit air under pressure to reach the ports 28 in the upstanding post portions of the holders 22, 24 and 26 so that settle blow air is available to the settle blow passageways 18, 18 in the settle blowheads and baffles 12, 14 and 16. Still with reference to FIG. 3, the opposite wall of the housing 44 defines three bifurcated brackets 58, 58 also shown in FIG. 1, for pivotally supporting a spring loaded lever 60 having a depending lower end portion 62 for releasably retaining the settle blowheads and baffles 12, 14 and 16 in their asociated holders 22, 24 and 26, respectively. A U-shaped spring 64 is provided for urging the lever 60 into its active position shown.

As mentioned hereinabove, each holder 22, 24 and 26 has an upstanding post portion, 30, 31 and 30 respectively, which is received in an oversize opening provided for this purpose in the lower wall 46 of the housing 44. Associated split rings such as shown in FIG. 3 at 34 and 36 with reference to the post portion 30 of the holder 22 are mounted against the lower outside surface of the lower wall 46 by means of a plurality of screws 65, 65 which pass through the oversized openings provided in the lower wall 46 of the housing 44 and through openings in the split ring half section 36 to be threadably received in openings provided for this purpose in sleeves 66, 68 and 66 associated with each of the holders 22, 24 and 26, respectively. Thus, the split rings are securely held to the carrier 40 and the holders 22, 24 and 26 are mounted for limited vertical movement in the carrier as a result of the annular recesses 32, 32 provided for this purpose in their post portions.

It should be noted, however, that the center sleeve 68 is urged downwardly by the lower wall 46 of the carrier 44 in FIG. 2, and that the center baffle holder 24 is held downwardly be said sleeve causing the baffle 14 to seat against the blank mold B. Thus the annular recess in the center post portion 31 dies not permit any vertical floating movement as do the recesses in the post portions 30, 30 associated with the other baffle holders 22 and 26.

In accordance with the present invention, a leaf-type spring, or resilient bar 70, is loosely held in the post portion 31 of the center holder 24 and has end portions which engage the upstanding post portions 30, 30 respectively of the holders 22 and 26 for urging the latter downwardly with respect to the center holder 24 when the leaf spring 70 is in its undeformed position shown in broken lines in FIG. 2. As there shown, a set screw 72 is threadably received in the upper end portion of the post 31 for engaging a U-shaped washer 74 which washer is engaged by the set screw 72 for presetting the position of a medial portion of the leaf spring 70 with respect to the center blank mold B. The end portions of the leaf spring 70 engage convex inner surfaces 30a, 30a of upwardly open slots 31, 31 provided in the upstanding post portions 30, 30 of the holders 22 and 26. Pins 76, 76 are provided in said post portions for preventing lateral sliding movement of the leaf spring 70 when the spring is in its undeformed condition. A cotter pin prevents the set screw 72 from rotating out of its preset position.

As so constructed and arranged, the carrier 40 can be lowered into position so as to register the baffles 12, 14 and 16 with their respective blank mold openings A, B, and C, and as a result of the initial position of the baffles 12 and 16 being somewhat lower than that of the center baffle 14, the endmost baffles 12 and 16 will initially engage the blank molds A and C so as to flex the leaf spring 70 toward the position shown in full lines in FIG. 2. Ultimately, the center baffle 14 will also contact its associated blank mold B but the leaf spring 70 will not be effected thereby, the carrier itself serving to urge the center baffle into the position shown. In practice, the weight of the carrier and its associated structure has been found to satisfactorily seat the center baffle 14, and the spring bar 70 serves to urge the other baffles 12 and 16 into position with a closing force substantially equal to the closing force on the center baffle.

I claim:

1. In a glassware forming machine having at least one section with at least three side-by-side molds, the improvement comprising a blowhead carrier adapted for movement toward and away from the upwardly open ends of said side-by-side molds, three blowhead holders in said carrier for releasably retaining three settle blowheads in depending relation for registration with said three upwardly open blank molds respectively, at least two of said holders being mounted in openings provided in said carrier for limited vertical floating movement with respect thereto, and a leaf spring with one portion restrained against vertical movement in said carrier, and said leaf spring having end portions for engaging the other two holders to bias said two holders downwardly with respect to the carrier with biasing forces which are equal to one another so that as said three blowheads are moved into registration with their respective mold openings said leaf spring end portions are resiliently deformed to equalize the closing forces between the blowheads and their respective molds.

2. The combination defined in claim 1 wherein said holders are mounted in side-by-side relationship in said carrier, and wherein said leaf spring has a medial portion restrained in said carrier by an upstanding post position of the middle holder, said middle holder being restrained against vertical movement in said carrier.

3. The combination defined in claim 2 wherein said other holders each include upstanding post portions having annular recesses defined therein, and snap ring means mounted to said carrier and projecting into said annular recesses for limiting the vertical floating movement of said two holders.

4. The combination defined in claim 3 wherein said post portion of said middle holder has an opening through which said leaf spring is slidably received, and a screw threadably received in the upstanding post portion for preloading said medial portion of said leaf spring, and said post portions of said two floating holders having an upwardly open slot with a convex inner surface for engagement with the end portions of said leaf spring, said two floating holders being urged toward initial positions somewhat below said middle holder by said leaf spring end portions as aforesaid.

5. The combination defined in claim 4 further characterized by sleeves for slidably supporting said floating holders, and means for adjustably mounting said sleeves to said carrier to permit the center distances of said floating holders to be varied with respect to said middle holder without disturbing said leaf spring and its preset screw.

References Cited

UNITED STATES PATENTS

| 2,464,335 | 3/1949 | McNamara et al. | 65—323X |
| 3,189,427 | 6/1965 | Schirm | 65—323 |
| 3,472,642 | 10/1969 | Irwin | 65—323X |

FRANK W. MIGA, Primary Examiner

U.S. Cl. X.R.

65—232, 307, 323, 359, 361